No. 616,272. Patented Dec. 20, 1898.
P. P. STIGEN.
THRESHING MACHINE IMPLEMENT.
(Application filed Mar. 30, 1898.)
(No Model.)
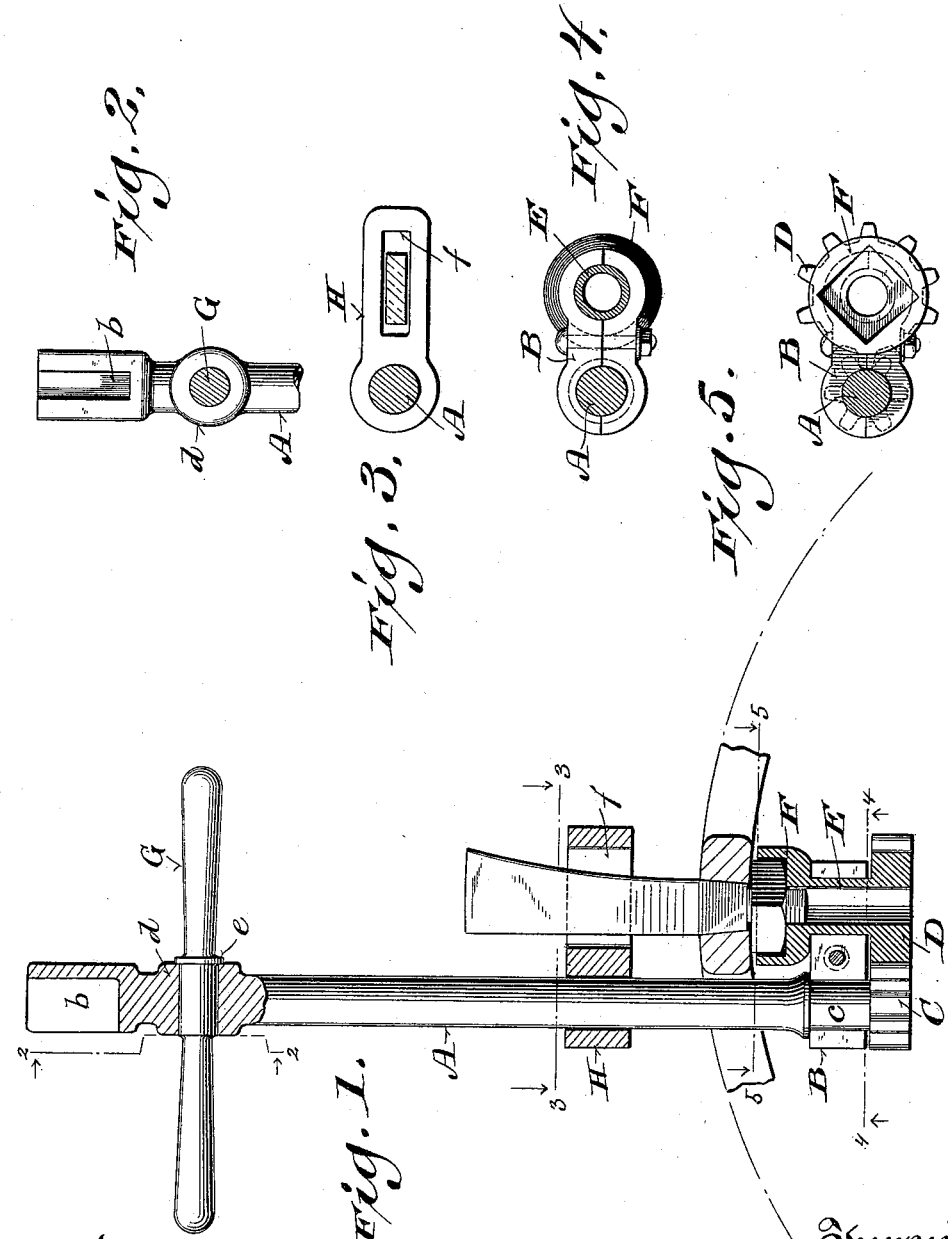
Witnesses:
Geo W Young
N. E. Oliphant
Inventor:
Peter P. Stigen
By H G Underwood
Attorneys

UNITED STATES PATENT OFFICE.

PETER P. STIGEN, OF BLOOMINGDALE, WISCONSIN.

THRESHING-MACHINE IMPLEMENT.

SPECIFICATION forming part of Letters Patent No. 616,272, dated December 20, 1898.

Application filed March 30, 1898. Serial No. 675,675. (No model.)

*To all whom it may concern:*

Be it known that I, PETER P. STIGEN, a citizen of the United States, and a resident of Bloomingdale, in the county of Vernon and State of Wisconsin, have invented certain new and useful Improvements in Threshing-Machine Implements; and I do hereby declare that the following is a full, clear, and exact description thereof.

My invention has for its object to provide a simple, economical, convenient, and effective implement for use in connection with the teeth of threshing-machine cylinders.

It therefore consists in certain peculiarities of construction and combination of parts hereinafter set forth with reference to the accompanying drawings and subsequently claimed.

Figure 1 of the drawings represents a partly sectional elevation of an implement in accordance with my invention and also illustrates an application of the same. Fig. 2 is a detail elevation of a portion of the implement, partly in section, as indicated by line 2 2 in the preceding figure; and Figs. 3, 4, and 5, horizontal sections, respectively indicated by lines 3 3, 4 4, and 5 5 in the first-described figure.

Referring by letter to the drawings, A represents a stem having one end thereof provided with a right-angle notch *b*, designed to fit upon a bent tooth of a threshing-machine cylinder, and by employing said stem as a lever said tooth may be readily straightened. The other reduced annular end *c* of the stem extends through a split bearing-box B, and fast on this latter end of said stem is a pinion C, in mesh with a spur-wheel D, cast with or otherwise rigid on a preferably tubular arbor E, that turns in the box and has a socket wrench-head F, the sections of said box being bolted together.

Below its notch *b* the stem A is provided with a swell *d*, having a center bore for the engagement of a detachable handle G, that extends at right angles to said stem and is provided with a stop-shoulder *e* to limit its movement transversely of the same, said handle being thus centered so as to project an equal distance in opposite directions from the aforesaid stem.

In sliding pivotal connection with stem A is an arm H, having a longitudinal slot *f*, and when the wrench-head F is engaged with the set-nut of a threshing-cylinder tooth the arm is adjusted to have its slotted portion engage said tooth, as shown in Fig. 1. The tooth is held against rotation by the arm H of the implement, and the stem A being rotated by means of its handle the above-described gearing will cause the wrench-head to operate the set-nut of said tooth in the desired direction.

From the foregoing it will be understood that I provide a geared wrench that may be readily applied and operated to tighten or remove the set-nuts of threshing-machine-cylinder teeth without endangering the hands of the operator, inasmuch as there is no slip on the part of said wrench, while at the same time an increase of power is obtained by the gearing. Hence the aforesaid wrench is more effective than those ordinarily employed.

Having thus fully described my invention, what I claim as new, and desire to secure by Letters Patent, is—

1. A threshing-machine implement comprising a stem having a reduced lower end, a handle connected to the stem, a longitudinally-slotted arm in sliding pivotal connection with said stem, a bearing-box fitting the lower end stem reduction, a pinion fast on the aforesaid stem below the bearing-box, a pinion engaging spur-wheel fast on an arbor arranged to turn in said bearing-box, and a wrench-head on the arbor above the aforesaid bearing-box.

2. A threshing-machine implement comprising a stem provided with an apertured swell, a handle having loose engagement with the stem-swell and provided with a stop-shoulder, a longitudinally-slotted arm in sliding pivotal engagement with the stem, a bearing-box on said stem, a wrench-head having an arbor that turns in said box, and gearing connecting the arbor and aforesaid stem.

In testimony that I claim the foregoing I have hereunto set my hand, at Bloomingdale, in the county of Vernon and State of Wisconsin, in the presence of two witnesses.

PETER P. STIGEN.

Witnesses:
OSCAR MORTERUD,
OSCAR WOLD.